Figure 1:
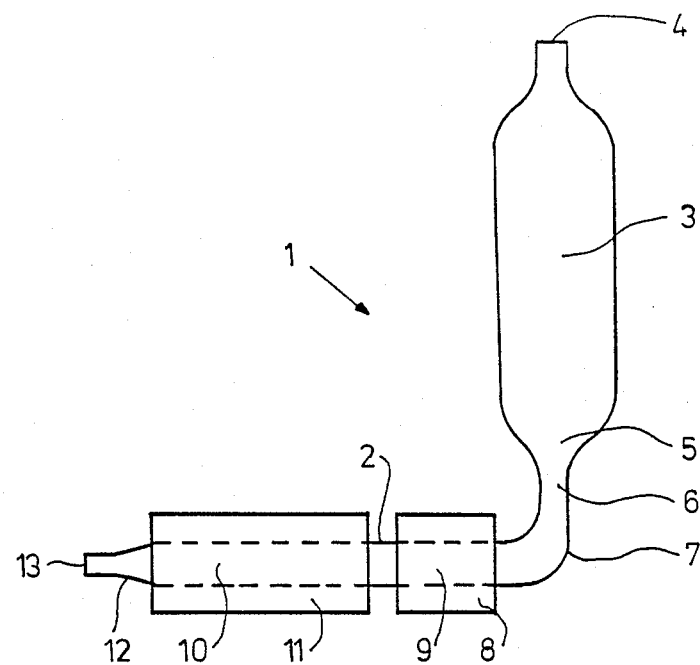

United States Patent [19]
Hieber

[11] Patent Number: 4,828,886
[45] Date of Patent: May 9, 1989

[54] METHOD OF APPLYING SMALL DROP-SHAPED QUANTITIES OF MELTED SOLDER FROM A NOZZLE TO SURFACES TO BE WETTED AND DEVICE FOR CARRYING OUT THE METHOD

[75] Inventor: Hartmann Hieber, Hamburg, Fed. Rep. of Germany

[73] Assignee: U.S. Philips Corporation, New York, N.Y.

[21] Appl. No.: 117,007

[22] Filed: Nov. 4, 1987

[30] Foreign Application Priority Data

Nov. 5, 1986 [DE] Fed. Rep. of Germany ....... 3637631

[51] Int. Cl.⁴ ............................................. B05D 1/02
[52] U.S. Cl. .................... 427/422; 427/100; 427/427; 239/102.2; 222/593; 346/140 R
[58] Field of Search .................... 239/102.2; 222/593; 346/140 R, 140 PD; 427/422, 100, 427

[56] References Cited

U.S. PATENT DOCUMENTS

| | | | |
|---|---|---|---|
| 3,298,030 | 1/1967 | Lewis et al. | 346/140 IJ |
| 3,683,212 | 8/1972 | Zoltan | 346/140 PD |
| 3,832,579 | 8/1974 | Arndt | 346/140 RD |
| 3,972,474 | 8/1976 | Keur | 239/102.2 |
| 4,418,354 | 11/1983 | Perduijn | 239/102.2 X |
| 4,527,717 | 7/1985 | Emoto et al. | 232/146.5 X |

FOREIGN PATENT DOCUMENTS 58-119461 7/1983 Japan.

OTHER PUBLICATIONS

I.B.M. Technical Disclosure Bulletin, vol. 14, No. 8, Jan. 1972, pp. 2354-2355.

Primary Examiner—Shrive Beck

[57] ABSTRACT

In a method of applying small quantities of melted solder from a nozzle to surfaces to be wetted, which are then solidified, the solder is caused to melt by heating and is propelled by means of a piezoelectric transducer used as a pressure generator from a delivery nozzle in the form of droplets onto the area to be wetted.

10 Claims, 1 Drawing Sheet

METHOD OF APPLYING SMALL DROP-SHAPED QUANTITIES OF MELTED SOLDER FROM A NOZZLE TO SURFACES TO BE WETTED AND DEVICE FOR CARRYING OUT THE METHOD

The invention relates to a method of applying small drop-shaped quantities of melted solder from a nozzle to surfaces to be wetted, which are then soldered by means of refusion to connections of components.

In soldering methods using refusion, it is required to wet the connection surfaces or the like with solder. For this purpose methods are known, in which a paste of solder powder is applied by printing to the surfaces to be wetted. It is further known to provide the connection surfaces by electro-deposition with the metallic constituents of the solder alloy.

It is required for reproducibly producing soft soldering connections of high manufacturing quality to take into account different marginal conditions. An important parameter is in this case the metering of the quantity of solder per soldering connection, which plays a decisive part in uniformly fusing, wetting and solidifying. In the aforementioned methods, during the subsequent soldering operation problems due to non-uniform wetting of the solder arise especially if components to be soldered and hence also the dimensions of their connection surfaces are reduced. These problems are further aggravated, as the case may be, in that the soldering process components and hence also soldering areas of different dimensions are to be soldered. In these cases and also for soldering extremely small components and hence extremely small soldering areas, the aforementioned methods can hardly be used because the reliable and reproducible soft soldering connections can no longer be obtained thereby.

Further a device for applying liquid solder from a nozzle is known from U.S. Pat. No. 4,527,717. The device has for this purpose a complicated mechanical construction, which includes of two valves, which are moved mechanically by rods. Such a mechanical system cannot be constructed with a justifiable amount of labour in such a manner that it propels small solder drops onto the areas to be wetted, so that these drops are applied without contact, because this requires very short pressure rise times in the nozzle, which is in conflict with the mechanical system with its accompanying masses.

The invention has for its object to provide a method of applying solder to surfaces to be wetted, which economically applies the solder in accurately predeterminable and reproducible quantities to the surfaces to be wetted.

According to the invention, this object is achieved in that solder is caused to melt by heating and is propelled in the form of droplets by means of a piezoelectric transducer used as a pressure generator from a delivery nozzle onto the area to be wetted.

This method permits of applying drops of solder of accurately known size emitted by a delivery nozzle to the areas to be wetted because the piezo-electric transducer used as a pressure generator permits of accurately metering the drops of solder. Such a converter has a simple construction, is substantially not liable to mechanical wear and can be electrically driven in a simple manner.

By a suitable choice of the number of drops to be applied, it is possible to apply an accurately defined quantity of solder to a surface. Thus, a basic condition is obtained for soldering in a soldering process connection surfaces or soldering areas of different sizes because by a suitable choice of the quantities of solder for each connection surface the soldering time can be brought to about a given value. This further affords the advantage that for several soldering areas, which may also be of different sizes, a substantially similar structure of the soldering areas is obtained after the soldering process. The method of applying the solder in the form of droplets by means of a piezoelectric transducer from a delivery nozzle further has the advantage that contact with the surfaces to be wetted or connections does not occur. This is of importance especially for sensitive soldering areas of very small size. For such soldering areas it is especially advantageous that the solder can be accurately applied by means of the piezo-electric transducer from the delivery nozzle to a desired area.

According to a further embodiment of the method, it is ensured that the solder is propelled out of a delivery nozzle having an inner diameter of 100 $\mu$m. The choice of this inner diameter for the delivery nozzle has proved to be advantageous. The droplets of solder emitted by the delivery nozzle have a diameter of about 60 to 80 $\mu$m, which is a suitable value especially for small soldering surfaces.

According to a further embodiment of the invention, the piezo-electric transducer is acted upon by electric voltage pulses, whose duration is about 40 to 100 $\mu$sec and whose succession times are about 100 to 300 sec. The voltage pulses advantageously have an amplitude of about 200 to 500 V. In this way it is possible to emit droplets of solder having a diameter of about 60 to 80 $\mu$m in a succession time of about 100 to 300 $\mu$sec. The piezo-electric transducer permits therefore of emitting droplets from the delivery nozzle in a very short succession time. Further, the pressure shocks produced by the piezo-electric transducer have the required rise time to emit droplets of small diameter from the delivery nozzle.

According to a further embodiment of the invention, in order to apply the drops of solder to different soldering areas of a work-piece, this work-piece is moved relative to the delivery nozzle. In the method according to the invention, it will generally be advantageous to move not the delivery nozzle, but the soldering areas of a work-piece to be wetted and thus to bring this work-piece to the desired position relative to the delivery nozzle. The accuracy of the position of the drops of solder to be applied is then determined only by the accuracy of the positioning of the work-piece.

According to a further embodiment of the invention the solder is supplied to the pressure generator from a supply container after having passed through a heating device. The solder is melted by heating advantageously by means of a heating device arranged in the path of flow of the solder in front of the pressure generator. This heating device may be constructed in different ways; a heating of the solder by means of radiation heat has proved to be advantageous.

According to a further embodiment of the invention, a eutectic alloy of at least two of the elements lead, tin, bismuth and indium is used as solder. Eutectic alloys of these elements have comparatively low melting points. This is advantageous for the use of such solders in the present method because the solder must be heated in the heating device to comparatively low values so that also the succeeding pressure generator is not too heavily thermally loaded.

According to a further embodiment of the invention, in a device for applying small drop-shaped quantities of melted solder for carrying out the method according to the invention a supply container for receiving solder is provided, which merges into one end of a tubular duct, which is provided in its central region with a heating device, while at its other end a tubular piezo-electric transducer is provided, which is followed by the delivery nozzle.

The solder is supplied to a first end of the tubular duct from a supply container. Approximately in the central region, the tubular duct is provided with a heating device. At the other end a tubular piezo-electric transducer is provided on the tubular duct and is followed by the delivery nozzle. Thus, it is guaranteed that pressure shocks produced by means of the piezo-electric transducer urge the solder towards the delivery nozzle, because the solder cannot escape in the direction of the supply container, since the solder present in the tubular duct between the piezo-electric transducer and the opening to the supply container has a sufficient inertia and does not permit that the solder escapes in the direction of the supply container.

Thus, it is therefore guaranteed, without further measures being taken, that the pressure shocks produced by the piezo-electric transducer emit the solder in the desired manner from the delivery nozzle.

According to a further embodiment of the invention the supply container is acted upon by a gas pressure. When the supply container and hence also the tubular duct are acted upon by a gas pressure, it is possible to press the solder in the tubular duct before it is applied to a connection surface or the like towards the opening of the delivery nozzle, so that with subsequent pressure shocks produced by means of the piezoelectric transducer the solder is emitted from the delivery nozzle in the form of droplets.

Figure 2:
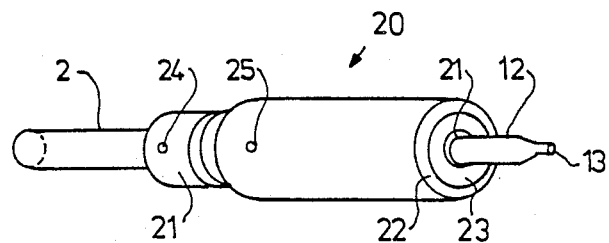

In order that the invention may be readily carried out, it will now be described more fully with reference to the accompanying drawings, in which:

FIG. 1 shows diagrammatically a device particularly suitable for carrying out the method according to the invention, FIG. 2 shows on an enlarged scale a piezo-electric transducer used as a pressure generator.

A device 1 shown diagrammatically in FIG. 1 has a glass tube 2 and a supply container 3. The supply container 3 is narrowed upwards to an inlet opening 4 and downwards to an outlet opening 5. This outlet opening 5 merges into a first end 6 of the glass tube 2. Behind the end 6 the glass tube is bent in a region 7 through about 90° towards the outlet opening 5 of the supply vessel 3. The glass tube 2 extend otherwise substantially in the horizontal direction. The bent region 7 of the glass tube 2 is followed by a region 9 of the glass tube 2 extending substantially in the horizontal direction. A tubular device 8 is provided on this region. The heating device 8 is shown in the figure only diagrammatically; for example, an electric heating coil may be provided. The heating device 8 is followed in a region 10 of the glass tube 2 by a pressure transducer 11 also shown only diagrammatically. Behind the pressure transducer the glass tube 2 is narrowed towards a delivery nozzle 12, which has an outlet opening 13.

The operation of the device shown in FIG. 1 is as follows:

The supply vessel 3 is filled with pieces of a low-melting-point soft solder, which reach the heating device 8 by way of the outlet opening 5 of the supply container and the region 7 of the glass tube 2. In this heating device, the solder is heated to above its melting point and reaches the pressure transducer 11 and thence the delivery nozzle 12. In order to press the liquid solder in a desired manner to the outlet opening 13 of the delivery nozzle 12, the inlet opening 4 of the supply vessel 3 is acted upon by a suitable adjustable gas pressure. By a suitable adjustment of the gas pressure, the solder is pressed just to the outlet opening 13. The regions 9, 10 of the glass tube 2 and the delivery nozzle 12 are now filled with liquid solder, which no longer may contain any gas bubbles. In this state, the device 1 can be used to apply by means of pressure shocks produced by the pressure transducer 11 drops of solder from the delivery nozzle 12 to a connection surface to be wetted or the like. The pressure shocks produced by the pressure transducer 11 press the solder in the glass tube 2 towards the delivery nozzle 12, because the solder in the regions 9 and 7 of the glass tube 2 has a sufficient inertia and consequently the solder in the region 10 can escape only in the direction of the delivery nozzle 12. This effect is intensified in that the solder in the supply vessel 3 acts on the solder in the region 7 and the supply vessel 3 is acted upon by a gas pressure.

In a preferred embodiment, the following dimensions were chosen:

inner diameter of the glass tube 2 in the regions 9 and 10: 1 mm, length of the pressure transducer 11: 10 to 20 mm, length of the region 9 of the glass tube 2: 30 mm, diameter of the outlet opening 13 of the delivery nozzle 12: 100 $\mu$m.

The pressure transducer 11 shown only diagrammatically in FIG. 1 may be, for example, a piezoelectric transducer 20 shown in FIG. 2. The transducer 20 is provided on the glass tube 2, which merges behind the piezoelectric transducer 20 into the delivery nozzle 12 with the outlet opening 13. In known manner, the piezoelectric transducer 20—designated in usual manner by the abbreviation PXE—consists of an inner electrode 21 disposed directly on the outer surface of the glass tube 2, an outer electrode 22 and an interposed piezo-electric element 23. The inner electrode 21 extends at one end around the front face of the piezoelectric element to the upper side of the said element and is separated from the outer electrode 22 by an electrically non-conducting gap. As a result, a simple connection by connection wires 24 and 25 is permitted, of which the connection wire 24 is connected to the electrode 21 and the connection wire 25 is connected to the electrode 22. By the application of suitable voltage pulses to the connections 24 and 25 and hence to the electrodes 21 and 22, the piezoelectric element 23 contracts radially and compresses the glass tube 2. Thus, liquid solder present in the glass tube 2 is emitted from the outlet opening 13 of the delivery nozzle 12.

With the aforementioned size parameters of the glass tube and of the outlet nozzle, it has proved to be advantageous that electrical voltage pulses having an amplitude of 200 to 500 V, whose duration is about 40 to 100 $\mu$sec and whose succession time is about 100 to 300 $\mu$sec, are applied to the two electrodes 21 and 22. Thus, the transducer 20 produces pressure shocks, which lead to the expulsion of drops of solder, which have a diameter of about 60 to 80 μm. When they strike colder surfaces, these drops of solder then solidify in a short time.

I claim:

1. A method of applying small drop-shaped quantities of melted solder from a nozzle of a suitable conduit to surfaces to be wetted which quantities are then solidified to connections of components, wherein said solder is melted in said conduit and maintained melted in said conduit by heating said conduit, said melted solder being propelled by means of a piezolectric transducer used as a pressure generator from said nozzle in the form of droplets onto the surfaces to be wetted.

2. A method as claimed in claim 1, wherein the solder is propelled out of a delivery nozzle having an inner diameter of 100 μm.

3. A method as claimed in claim 1, wherein the piezoelectric transducer is acted upon by electrical voltage pulses, whose duration is asbout 40 to 100 μsec and whose succession time is about 100 to 300 μsec.

4. A method as claimed in claim 3, wherein the voltage pulses have an amplitude of about 200 to 500 V.

5. A method as claimed in any one of claims 1 to 4, wherein for the surfaces to be wetted, in dependence upon their size, a suitable number of solder droplets is applied.

6. A method as claimed in any one of claims 1 to 3, wherein for applying the solder droplets to different areas of said soldering surfaces of a work-piece the work-piece is move relative to said nozzle.

7. A method as claimed in any of claims 1 to 3, wherein the solder is propelled by the pressure generator from a supply container after having passed by a heating device which maintains said solder melted.

8. A method as claimed in any one of claims 1 to 3, wherein said solder comprises a eutectic alloy of at least two of the elements lead, tin, bismuth and indium.

9. A device for applying small drop-shaped quantities of melted solder for carrying out the method claimed in anyof claims 1 to 3, wherein a supply container for receiving solder is provided, which merges into one end of said conduit, said conduit being provided in its central region with a heating device and at its nozzle with a tubular piezoelectric transducer said transducer being followed by said nozzle.

10. A device as claimed in claim 9, wherein the supply container is acted upon by a gas pressure.

* * * * *